United States Patent [19]
Acres et al.

[11] 3,915,898
[45] Oct. 28, 1975

[54] CATALYST

[75] Inventors: Gary James Keith Acres; Alan Sydney Darling; Laurence Alfred Heathcote; Eric Shutt; Gordon Leslie Selman, all of London, England

[73] Assignee: Johnson, Matthey & Co., Limited, London, England

[22] Filed: Aug. 9, 1972

[21] Appl. No.: 279,049

[30] Foreign Application Priority Data
Aug. 9, 1971 United Kingdom............ 37304/71

[52] U.S. Cl............. 252/470; 23/288 R; 75/172 R; 252/472; 252/477
[51] Int. Cl.² .. B01J 23/40; B01J 8/04; B01J 23/64; C22C 5/04
[58] Field of Search................. 23/288 R; 75/172 R; 252/467, 470, 472, 477

[56] References Cited
UNITED STATES PATENTS

| | | | |
|---|---|---|---|
| 1,927,963 | 9/1933 | Taylor.............................. | 252/472 |
| 1,978,198 | 10/1934 | Handforth...................... | 252/472 |
| 2,018,760 | 10/1935 | Hickey............................. | 252/472 |
| 2,648,393 | 8/1953 | Holzmann...................... | 23/288 R X |
| 2,730,189 | 1/1956 | Holzmann...................... | 23/288 R X |
| 2,747,679 | 5/1956 | Ruthardt....................... | 23/288 R X |
| 3,434,826 | 3/1969 | Holzmann.................. | 23/288 R UX |
| 3,660,024 | 5/1972 | Gillespie..................... | 252/477 R X |

FOREIGN PATENTS OR APPLICATIONS
75,625   9/1949   Norway

OTHER PUBLICATIONS
Handforth et al., "Catalysts for Oxidation of Ammonia to Oxides of Nitrogen," I & EC, Vol. 26, No. 12, Dec. 1934, pp. 1287–1292.

*Primary Examiner*—Joseph Scovronek
*Assistant Examiner*—Barry I. Hollander
*Attorney, Agent, or Firm*—Cushman, Darby & Cushman

[57] ABSTRACT

Arrangement of catalytic gauzes for catalysing a reaction between two or more gases when passed through the gauzes. Essentially the arrangement comprises a first group of gauzes made from a precious metallic material and a second group of gauzes disposed on the downstream side of the first group of gauzes. The second group of gauzes are made from at least one material which is selected from the group consisting of non-precious metallic materials and materials which are less easily volatalised and carried away by the gases than the precious metallic material of the first group of gauzes. The second group of gauzes assist in use in catalysing the reaction.

3 Claims, 1 Drawing Figure

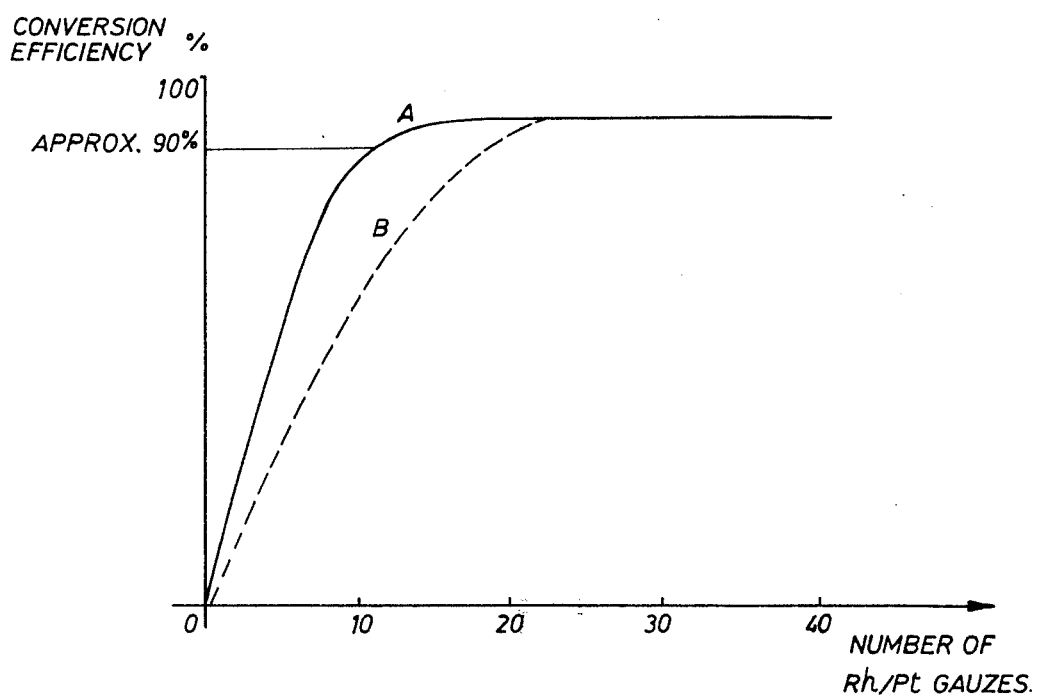

CATALYST

This invention relates to catalyst systems embodying catalyst material in wire or strip form.

One well known form of such a system is used in the oxidation of ammonia gas to oxides of nitrogen and water during the manufacture of nitric acid. In this process, ammonia gas and air at high pressure are passed downwards at high speed through a closely-packed sequential array of catalytic gauzes woven from rhodium-platinum wire.

The gases typically enter the gauzes at a temperature of about 250°C and, because the catalysed oxidation process is highly exothermic, leave them at a temperature typically in the region of 900°C.

The gases are made to pass through the gauzes at high pressure and high speed to enhance their cooling effect on the gauzes, but, despite this, the gauzes are generally at red heat when in use.

A typical installation contains 20 to 40, 80 mesh gauzes woven from 0.003 inch diameter 10% rhodium-platinum wire and will operate at a temperature of 800°–900°C.

Arrangements of catalytic gauzes of the type described above effectively catalyse the oxidation of ammonia gas to nitrogen oxides and water. They suffer, however, from the well-known disadvantage that in service, and in the absence of special precautions to reduce the effect, significant quantities of platinum and rhodium are volatilised from the gauzes, carried away in the gas stream and lost.

There have been many attempts in the past to reduce these losses but all involve the use of "catchment gauzes", "getters", filters, traps and the like designed to recapture precious metal from the gas stream after it has been volatilised from the gauzes. These recovery systems have had some success but, by their very nature, are relatively expensive and time-consuming to operate since the metal they capture has subsequently to be separated from the particular catchment device employed.

There is today a tendency towards an increase in the pressure of the gas mixture which is passed through the gauzes and this in turn tends towards an increase in the quantity of metal volatilised. It is accordingly becoming increasingly important to provide means of reducing precious metal losses from catalyst gauzes and this the present invention aims to do.

We have now found that precious metal losses from an array of catalytic gauzes used for catalysing a reaction between two or more gases passing through the gauzes may be significantly reduced by replacing some of the gauzes on the downstream side of the array by gauzes woven from non-precious metal or from material which is less easily volatilised and carried away by the gases than the material of the other gauzes or both and which may either have or may in service acquire suitable catalytic properties. Further, we have found that the use of such an arrangement need not, provided the number of gauzes replaced is properly chosen, materially reduce the conversion efficiency of the systems. It may even increase it.

The actual mechanism of the loss of metal from catalytic gauzes is a little uncertain. It seems probable, however, that whiskers first develop on the surface of the wires, that these whiskers are more easily volatilised and carried away by the gas passing through the gauzes than is metal from the body of the wire and that as a whisker is eroded by volatilisation, it tends to grow so as to replace the volatilised metal by metal from the body of the wire. It follows that one way of preparing gauzes for use on the downstream side of an array of gauzes in accordance with the invention is to treat the metal from which the gauze wires are made or the wires themselves in such a way as to inhibit whisker formation under the conditions in which the gauzes will be used. Alternatively, the wire from which the gauzes are formed may be made of a metal which is not prone to whisker formation.

Our experiments have shown us that, in accordance with the invention, stainless steel gauzes, and particularly gauzes woven from wire made of the Austenitic stainless steel known as "Immaculate 5" are eminently suitable for use in conjunction with 10% rhodium-platinum gauzes for the catalytic oxidation of ammonia gas. Immaculate 5 consists essentially of 21% Ni, 23% Cr, about 56% Fe with traces of silver and silicon.

We found, for example, that if a mixture of 10 vol.% ammonia gas and air is passed through a pack of 16 10% rhodium-platinum gauzes followed by 24 Immaculate 5 gauzes, all these gauzes being woven at 80 meshes per square on from 0.003 inch diameter wire and being packed closely together so that they occupy a space in the direction of the gas flow of about one-fourth inch, the conversion efficiency of the system, when the ammonia-air mixture enters the gauzes at a temperature of 250°C, a pressure of 100 psig and a speed corresponding to a throughput of 120 tons $NH_3/m^2/$ day is 98%. This compares favourably with the conversion efficiency of 92% of a conventional stack of 40 10% rhodiumplatinum gauzes operated under the same conditions. Further, the rate of loss of platinum, under the conditions described, from the stack containing the 24 Immaculate 5 gauzes was only 189.1 mg/ton $HNO_3$ as compared with a rate of loss from the 40 10% rhodium/platinum gauze pack of 378 mg/ton $HNO_3$. The use of the 16 Rh/Pt 24 Immaculate 5 gauze pack in place of the conventional 40 Rh/Pt gauze pack would thus result in a saving of platinum group metal losses from the pack of virtually 50%.

We have found further that up to 75% of the rhodium-platinum gauzes in a stack may be replaced by Immaculate 5 gauzes with no significant loss of conversion efficiency. This is illustrated in the accompanying drawing in which the full line A represents the catalytic performances of various stacks of rhodium-platinum and Immaculate 5 gauzes. Each stack contained 40 gauzes made up of a certain number of rhodium-platinum gauzes as indicated by the reading on the horizontal axis followed by sufficient Immaculate 5 gauzes to make the total number up to 40 and, as will be seen from the graph, the conversion efficiency is upwards of 90% when the number of rhodium-platinum gauzes in the 40-gauze stack is about 10.

The performance of stacks of 10% rhodium-platinum gauzes not 'backed up' by stainless steel gauzes is shown by the dotted line B and, as will be seen, something like 20 gauzes are required before the conversion efficiency reaches 95%.

Our investigations have also shown that a conversion efficiency of 90% is obtained using a pack consisting of nine 10% Rh/Pt gauzes backed up with only six Immaculate 5 18 mesh gauzes formed from 0.008 inch diameter wire. The Immaculate 5 wire was coated with 10%

Rh/Pt in accordance with the method described in our British Pat. No. 1,147,563. If desired, a Fiberfrax wash coat may be applied to the Immaculate 5 prior to coating in accordance with British Patent No. 1,147,563.

Although we are uncertain of the precise mechanism whereby the present invention produces the good results indicated, it may be that, when the rhodium-platinum gauzes are backed up with stainless steel gauzes, some of the rhodium and platinum volatilised from the earlier gauzes is deposited on the stainless steel gauzes which thereby acquire catalytic properties. Again, it may be that the supporting Immaculate 5 gauzes act as a catalyst in their own right when the reaction has been triggered by the Rh/Pt gauses. Further, the backing up gauzes act as mechanical supports for the Rh/Pt gauzes and may contribute to the reduction in precious metal loss by acting as getters for metal volatilised from the up stream gauzes.

Other materials from which the backing-up gauzes may be made comprise:

Pt/Ni alloys with or without 20% Ru.
Pt/Ni/Cr alloys and in particular, 16Pt/67Ni/Cr.
Co/Rh/Pt alloys and in particular, 5Co/10Rh/85Pt.
Cr/Rh/Pt alloys and in particular, 5Cr/10Rh/85Pt.

It is believed that the inclusion of Co and Cr respectively in the last two alloys inhibits whisker formation.

The invention includes catalyst systems embodying catalyst packs as hereinbefore described, in which the gauzes thereof are made from wire or strip and the products of any reaction catalysed by such a catalyst system.

What we claim is:

1. In an arrangement for reacting at least two gases by passing them through a pack of catalytic gauzes, the improvement wherein said pack comprises a first group of gauzes made of an alloy consisting essentially of platinum and rhodium and a second group of gauzes disposed on the downstream side of the first group of gauzes for supporting the first group, the second group of gauzes being made of an alloy consisting essentially of platinum, nickel, and chromium.

2. An arrangement according to claim 1 where the second group of gauzes are made from an alloy containing 16 wt.% platinum, 67 wt.% nickel and balance, apart from impurities, chromium.

3. In an arrangement for reacting at least two gases by passing them through a pack of catalytic gauzes, the improvement wherein said pack comprises a first group of gauzes being made of an alloy consisting essentially of platinum and rhodium and a second group of gauzes disposed on the downstream side of the first group of gauzes and supporting the first group, the second group of gauzes being made of an alloy consisting essentially of platinum and nickel.

* * * * *